(12) United States Patent
Hofmann et al.

(10) Patent No.: US 7,573,901 B2
(45) Date of Patent: Aug. 11, 2009

(54) HUB-BASED MESSAGING SYSTEM

(75) Inventors: Christoph Hofmann, Wiesloch (DE);
Stefan Rossmanith, Walldorf (DE);
Andreas Dahl, Rauenberg (DE)

(73) Assignee: SAP AG, Walldorf (DE)

( * ) Notice: Subject to any disclaimer, the term of this patent is extended or adjusted under 35 U.S.C. 154(b) by 762 days.

(21) Appl. No.: 10/911,437

(22) Filed: Aug. 4, 2004

(65) Prior Publication Data
US 2006/0028994 A1   Feb. 9, 2006

(51) Int. Cl.
*H04J 3/16*   (2006.01)
(52) U.S. Cl. .................... 370/465; 370/466
(58) Field of Classification Search ......... 370/466, 370/465, 474, 401, 402, 403, 404, 395.5, 370/389, 392, 395.31, 395.54, 467, 471
See application file for complete search history.

(56) References Cited

U.S. PATENT DOCUMENTS

| | | | |
|---|---|---|---|
| 6,125,122 A | 9/2000 | Favichia et al. ............. 370/466 |
| 6,708,219 B1 | 3/2004 | Borella et al. ............... 709/245 |
| 7,116,681 B1 * | 10/2006 | Hovell et al. ................ 370/446 |
| 7,243,161 B1 | 7/2007 | Tappan et al. ............... 709/245 |
| 7,272,148 B2 | 9/2007 | Zhang et al. ................ 370/401 |
| 2002/0181464 A1 * | 12/2002 | Tsuchiya et al. ............ 370/392 |
| 2004/0174889 A1 * | 9/2004 | Kikuchi et al. .............. 370/401 |

* cited by examiner

*Primary Examiner*—Brenda Pham
(74) *Attorney, Agent, or Firm*—Mintz, Levin, Cohn, Ferris, Glovsky & Popeo, P.C.

(57) ABSTRACT

A messaging system may include a sender backend system, a receiver backend system, and one or more intermediate hubs. The backend systems and message hubs may have messaging software with different protocol versions. The messaging system is downward compatible such that messages routed from the sender backend system through intermediate message hubs are received by the receiver backend system with a protocol version compatible with that of the receiver backend system.

17 Claims, 4 Drawing Sheets

HUB-BASED MESSAGING SYSTEM

BACKGROUND

The following description relates to handling different protocol versions in a hub-based messaging system.

In a hub-based messaging system, messages are sent from a sender system to a receiver system using one or more message hubs. The sender and receiver systems each can have one or more associated message hubs. Messages can be sent from the sender system to the sender's system associated message hub. The messages may travel to a message hub of the receiver system or the messages may travel to one or more other message hubs before being received by a message hub associated with the receiver system. The messages can then be routed to the receiver system.

Hub-based messaging systems can use messaging software to send and/or receive messages. Each message hub can use messaging software with a certain message protocol. A protocol can refer to a convention or standard that controls or enables the connection, communication, and data transfer between two or more computing devices. The messaging protocol can define the format of the messages, as well as the handshakes and message flows between the backend systems and the associated message hubs.

SUMMARY

In one implementation, the present disclosure relates to a method for routing messages in a hub-based messaging system that involves receiving a message at a message hub that has an associated first protocol version. The method includes identifying a second protocol version associated with a link partner, comparing the first protocol version with the second protocol version, and selecting one of the protocol versions such that the selected protocol version is less than or equal to the other (unselected) protocol version. The method also includes routing the message to the link partner using the selected protocol version.

In one implementation, receiving the message may involve receiving a message transmitted from another message hub using a protocol version less than or equal to the first protocol version. Receiving the message may also involve receiving a message transmitted from a sender backend system using a protocol version less than or equal to the first protocol version. Routing the message may include routing the message to another message hub or routing the message to a receiver backend system. Identifying the second protocol version may include identifying an entry associated with the link partner in a table.

The method may also include updating the entry in response to the link partner being upgraded from the second protocol version to a third protocol version, and in response to receiving another message to be routed to the link partner, selecting one of the first and third protocol versions such that the selected protocol version is less than or equal to the other (unselected) protocol version. The method can also include routing the message to the link partner using the selected protocol version.

In another aspect, described is a message hub having an associated first protocol version. The message hub includes a storage device to store an identifier that identifies a second protocol version that is associated with a link partner. A protocol selector selects one of the first and second protocol versions such that the selected protocol version is less than the other (unselected) protocol version. The message hub also includes a messaging module to prepare a message for routing to the link partner that utilizes the selected protocol version.

In another aspect, described is an article that includes a machine-readable medium with instructions to cause one or more machines to receive a message at a message hub that has an associated first protocol version. The instructions include identifying a second protocol version associated with a link partner, comparing the first protocol version with the second protocol version, and selecting one of the protocol versions such that the selected protocol version is less than or equal to the other (unselected) protocol version. The instructions also include routing the message to the link partner using the selected protocol version.

In another aspect, described is an apparatus that includes a computer-readable storage medium tangibly embodying program instructions for sending a message. The program instructions include instructions to cause a computer to receive messaging software for installation and to install the messaging software. The installation is independent from installations in peer computers, and the messaging software has a software protocol version. The instructions also cause a computer to recognize the software protocol version in the peer computers, and to pass a message between the computer and a peer computer using the lower software protocol version between the computer and the peer computer.

The systems and techniques described here may provide one or more of the following advantages. For example, the hub-based messaging system can allow flexible upgrades of the installed messaging software in the various system and hub components, even in cases when the messaging software in the sending and the receiving system are not compatible due to differing versions. The hub-based messaging system also has several advantages when upgrading software in one or more of the various components. For example, system-level downtime can be avoided when upgrading the software in one or more components because there is not a requirement to upgrade or reconfigure the entire messaging system at one time. The sender and receiver systems and their associated message hubs can be independently upgraded without the loss of messaging functionality. Old messages that are stored in the database layer of one or more hubs can be processed after the upgrade.

The details of one or more implementations are set forth in the accompanying drawings and the description below. Other features and advantages will be apparent from the description and drawings, and from the claims.

DRAWING DESCRIPTIONS

Like reference symbols in the various drawings may indicate like elements.

DETAILED DESCRIPTION

The present disclosure describes systems, methods, and techniques in which a hub-based messaging system can allow a flexible upgrade of the messaging software installed in the participating components of the messaging system. The protocol versions of the messaging software in the sender and receiver systems can differ among the various components in the sender and receiver systems.

Figure 1:
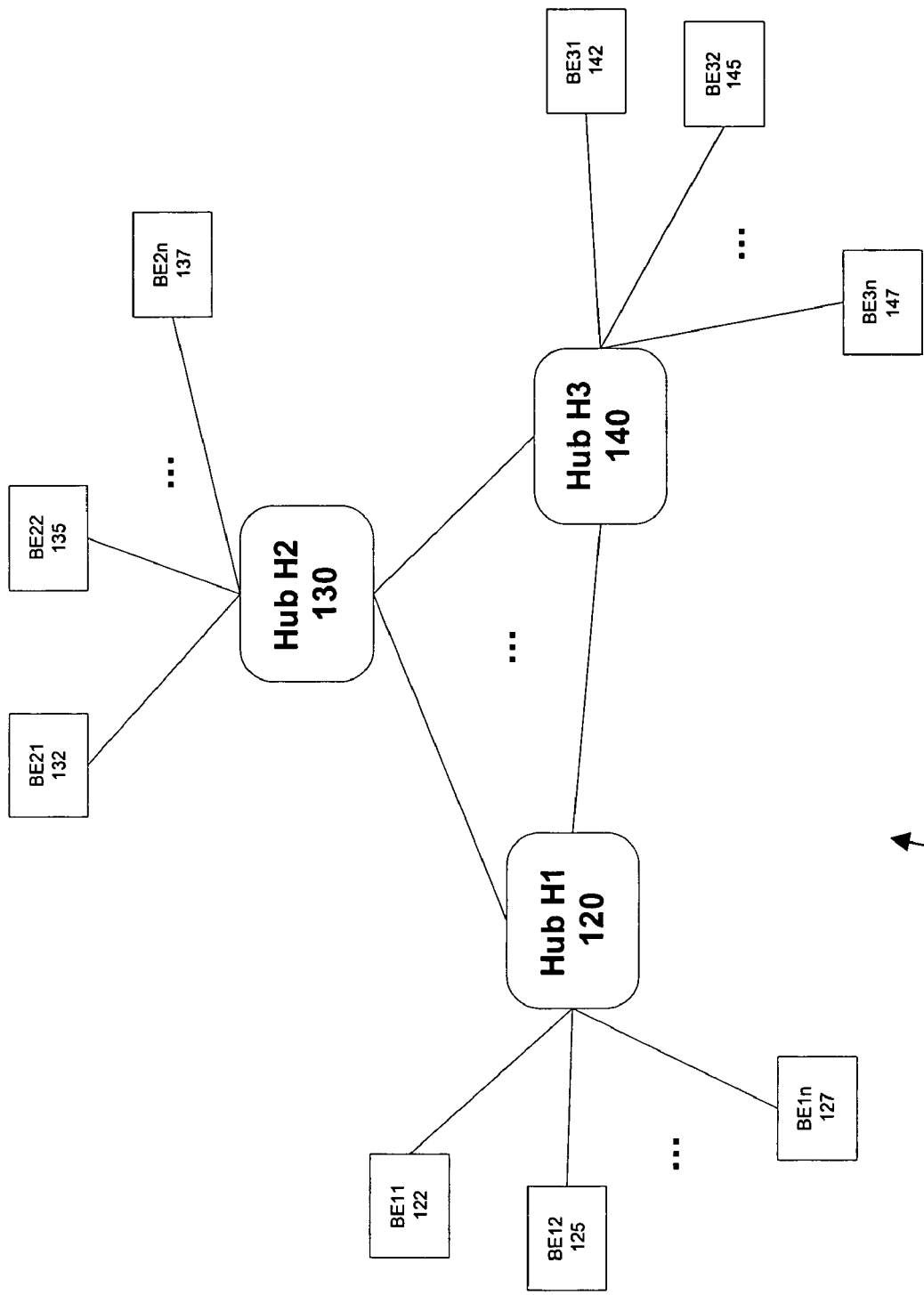
FIG. 1 is a diagram of a hub-based messaging system.

FIG. 1 shows a diagram of an exemplary hub-messaging system 100. The system 100 shows backend systems that are connected to a hub. For instance, backend systems BE11 (122), BE12 (125), and BE1*n* (127) are connected to hub H1 (120). The hubs 120, 130, 140 are linked so that disparate backend systems can communicate and transmit messages. For example, a message can be transmitted between backend systems BE11 (122) and BE31 (142) using the linked hubs H1 (120) and H3 (140). The messaging system's components typically include loosely-coupled systems.

The messaging software has a least two parts, in which each part depends on the role of the component. Each backend system has an installed backend part of the messaging software, and each associated hub has a hub part of the messaging software. As components are added and/or updated to the messaging system, where each component may exhibit a different version of the messaging protocol due to different component versions. Traditionally, the differing versions of the protocol may be incompatible, and an inhomogeneous, inoperable messaging system may result from the incompatible protocol versions.

A conventional approach to make the messaging software components compatible is to make the messaging system have the same protocol version across all of the components of the messaging system. Conventionally, the entire messaging system has to be brought down in order to install another messaging software version, and consequently, the backend systems and their associated hubs require downtime for installing messaging software updates and/or compatible protocol versions. The messaging software system typically has a persistency layer where messages are stored for later execution. However, after an upgrade is performed in a conventional approach, those messages may not be delivered and may be lost because one or more messages may be of a former, incompatible protocol version format. The conventional approach would require that all messages in the persistency layer be processed prior to the upgrade and would not accept any new messages for transmission before bringing down the messaging system for software updates.

In an embodiment, the hub-based messaging system may have messaging software that is "downwards compatible". In being downwards compatible, a message hub can receive messages of an earlier or same protocol version, and can send out messages of an earlier or same protocol version. As used here, a "lower" protocol version can mean an "earlier" protocol version, an "equal" protocol version can mean a "same" protocol version, and a "higher" protocol version can mean a "later" protocol version. Each hub can have an installed version of the messaging software that has the same or later version than the messaging software of all associated backend systems.

In an embodiment, message hubs have knowledge of the protocol version of its connected peers. For instance, the protocol may have evolved in several development steps where some versions of the message protocol may have been defined. In one implementation, each protocol version can coincide with the version of the messaging software (i.e., the messaging software version v is able to exhibit protocol version v and not a higher version). In one implementation, there may be conditions in which the software protocol versions are linearly ascending and that for any two software protocol versions v1 and v2, there is a relationship v1<v2, or v1=v2, or v1>v2. The version of the protocol can be explicitly (e.g., by a dedicated protocol version tag) or implicitly (e.g., by the existence or non-existence of some message parts) derived from a single message, and each part of the messaging software can determine a corresponding protocol version for the message being transmitted.

A message hub can be configured to knowledge of the protocol version of its link partners, e.g., the backend system(s) and/or other message hub(s) to which it is connected. This information may be stored in, e.g., a look-up table. The look-up table may be updated manually or automatically when a link partner is updated to a higher protocol version. For example, the message hub may update an entry in a look-up table for a link partner when the message hub receives a message with a protocol version higher than the look-up table indicates for that link partner. Messages can be sent from a sender system to a receiver system through the message hubs, and each message hub can route the message to the next hub with an equal or lower protocol version. The sender system can use its installed message software to send out the message with a corresponding protocol version. The message hub can select a lower or equal protocol version according to having knowledge of the message hub's link partners, and can route the message to the next message hub or to the receiver system.

In an embodiment, when the message is routed to the next message hub, the lower protocol version of the two hubs may be used. The technique insures that when the message is routed to the receiver system, the message has a protocol version that is compatible with the protocol version of the receiver system. Furthermore, the downwards compatibility of the system enables messages stored in the persistency layer before a software upgrade of a system component to be processed after the software update.

Figure 2A:
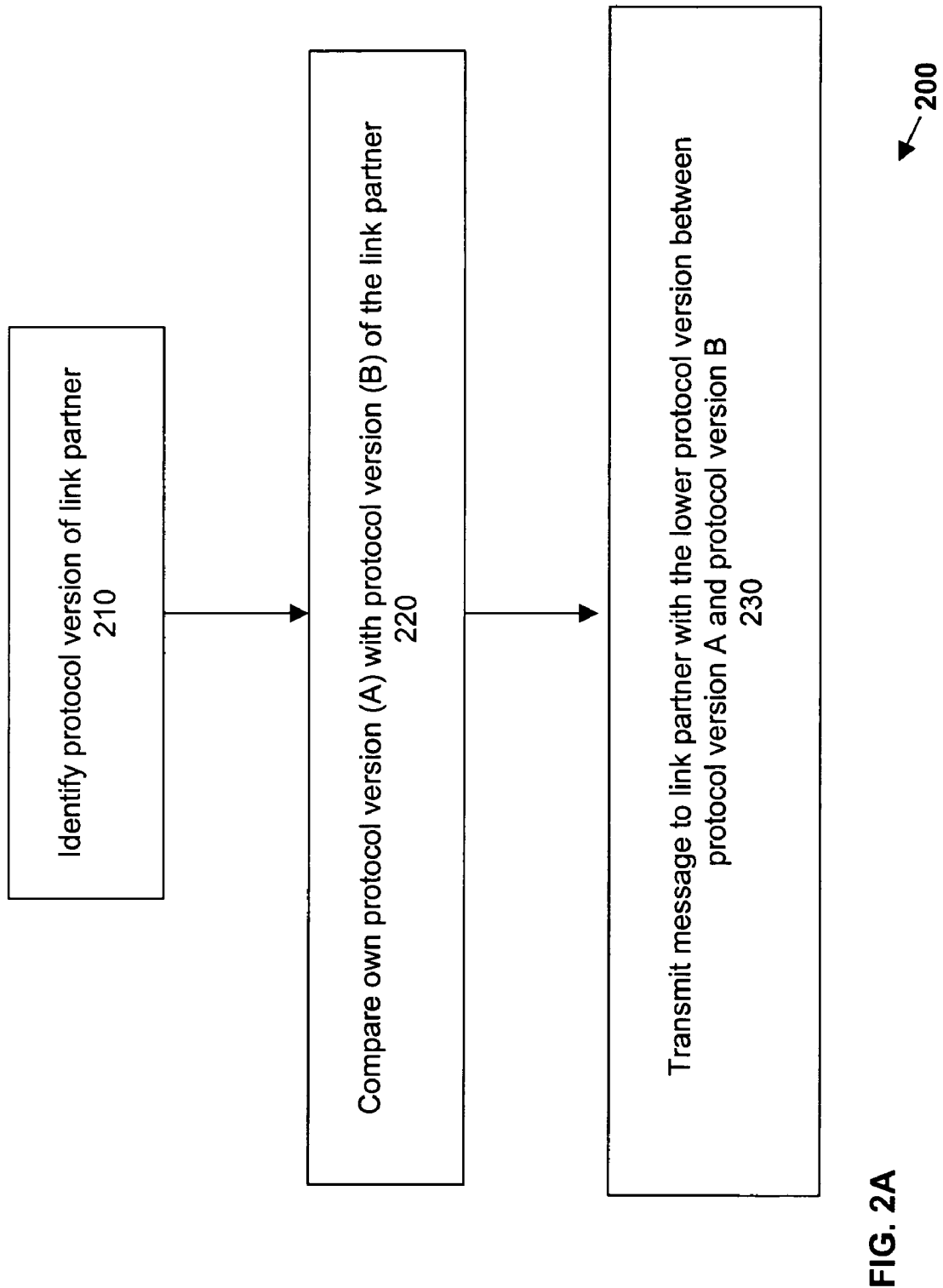
FIG. 2A shows an exemplary flow diagram with a messaging routing flow within a message hub.

FIG. 2A shows a flow diagram with a messaging routing flow. The message routing flow can refer to a process of having a message traveling from the sender system to the receiver system using one or more message hubs. When a message hub receives a message, the message hub can identify the protocol version of its link partner (block 210). The link partner may be a backend system or another message hub. The knowledge of the protocol version may be achieved via configuration. The message hub can compare its installed protocol version (e.g., protocol version A) with the installed protocol version (e.g., protocol version B) of the link partner (block 220). The message hub can transmit messages to the link partner component with the lower protocol version between the message hub and the link partner (e.g., the lower version between protocol version A and protocol version B) (block 230).

Figure 2B:
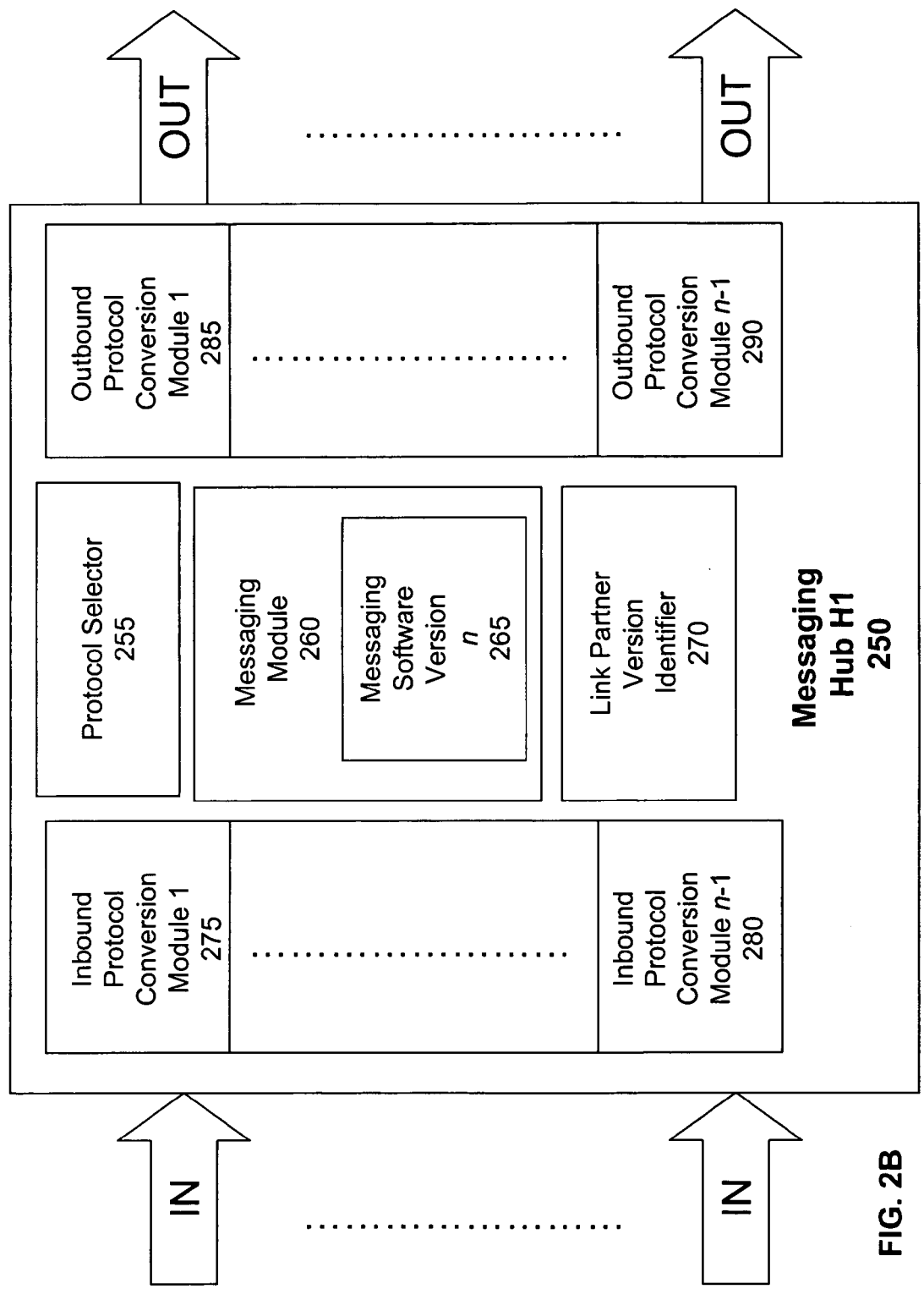
FIG. 2B shows a block diagram of messaging components associated with an exemplary message hub.

FIG. 2B shows a block diagram of messaging components associated with an exemplary message hub. The message hub, Hub H1 250, is configured to receive and send messages to one or more link partners. A messaging module 260 can facilitate the reception and transmission of messages, and may include one or more software and/or hardware components. One of the software components includes messaging software of a certain version, messaging software version 265, which is installed on messaging hub 250 and is able to act according to certain protocols both in a hub receiver and a hub sender role. The message hub 250 has a link partner version identifier module 270 that recognizes the protocol version of the link partners. A protocol selector module 255 can select the appropriate software protocol version to use when sending a message between the message hub 250 and a link partner.

In an embodiment, message hubs can be individually upgraded without affecting the functionality of the backend systems (e.g., the sender and/or receiver system). When a backend system is upgraded, the status of the upgrade can be made available to all concerned message hubs as long as each of the message hubs have installed a protocol version of the message hub part of the messaging software that is equal to or higher than the messaging software protocol version of all of the backend systems.

As illustrated in FIG. 2B, protocol converter modules of versions 1 (275, 285) to versions n−1 (280, 290) can be on the inbound and the outbound side in a message hub of version n. On the inbound side after the protocol selector 255 has discovered that the received message is of protocol version i, with 1<=i<n, the inbound protocol converter module of version i is used to transform the protocol upwards from version i to version n. Afterward the conversion, the message processing occurs according protocol version n. The link partner version identifier 270 can determine the protocol version of the next link partner. Accordingly, on the outbound side, after the link partner version identifier 270 discovers that the outbound message is to be of protocol version j, with 1<=j<n, the outbound protocol converter module of version j is used to transform the protocol downwards from version n to version j. In this implementation, the message hub processing is always of version n. If the incoming or outgoing messages are of protocol version n, the protocol converter modules do not have to be used to convert the protocol to protocol version n.

Figure 3:
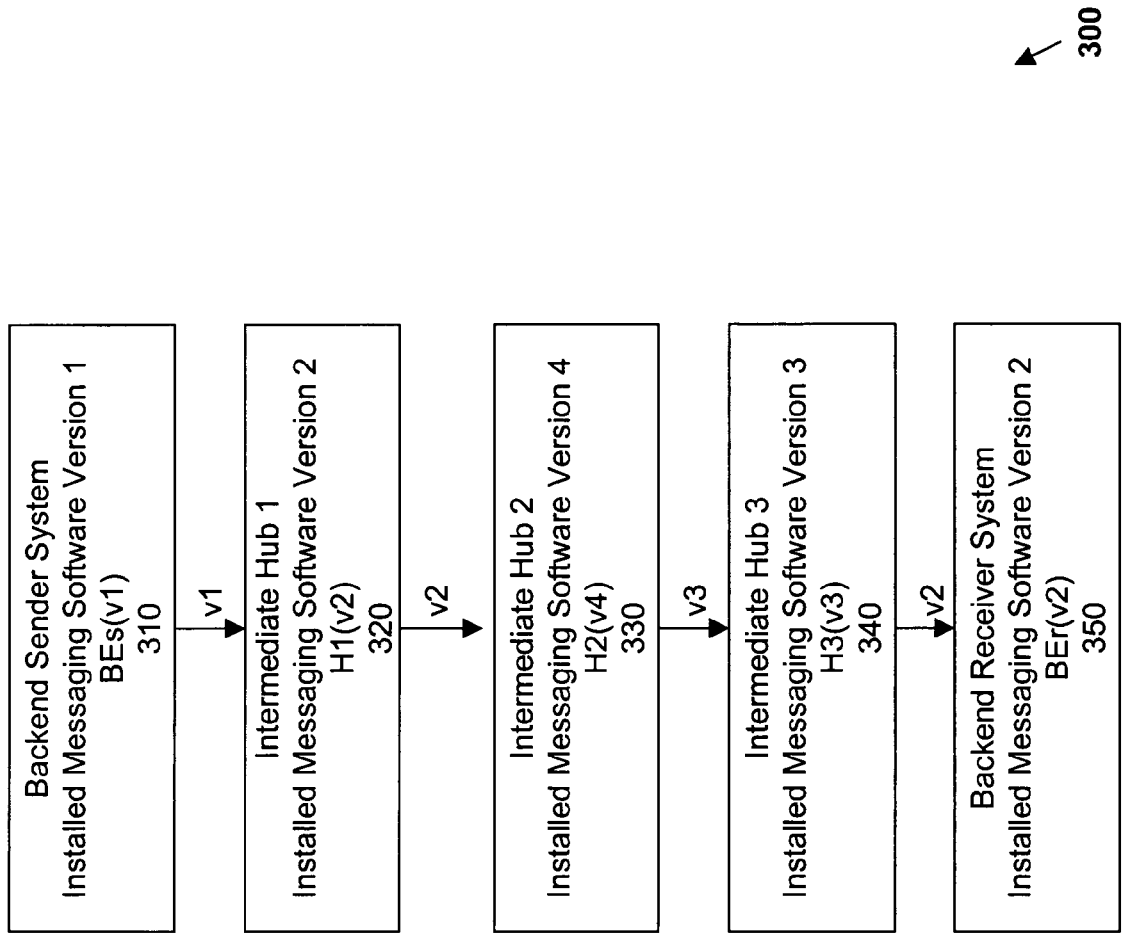
FIG. 3 is a block diagram of a message path when traveling from the sender system to the receiver system.

FIG. 3 is a block diagram 300 of a message path when traveling from the sender backend system, BEs 310 to the receiver backend system, BEr 350. The message travels through a number of intermediate hubs 320, 330, 340, in which the installed messaging software version of the messaging hub can differ from the messaging hub's connected peers.

The messaging software part of the backend systems may only exhibit one protocol version, namely the actual version of the messaging software version. Whenever the receiver system 350 receives a message that does not conform to the protocol version of the receiver system, the receiver system can send an error message back to the sender system 310.

The messaging software part of the message hubs 320, 330, 340 can be downwards compatible so that the message hubs can accept messages sent in a lower or equal protocol version and send out messages in a lower or equal protocol version. The overall semantics can be preserved for the sender system 310 sending the message to the message hub 320, and the receiver system 350 receiving the message from the message hub 350 in potentially different protocol versions. Whenever the message hub 320 receives a message of a higher protocol version, the message hub can send back an error message.

The downwards compatibility enables messages in the database/persistency layer of the messaging software that have been previously stored to be executed after the upgrade. Accordingly, the stored messages can be processed after the upgrade and no system-wide downtime is required for the upgrade.

Each message hub 320, 330, 340 can have an installed messaging software protocol version of the message hub part of the messaging software that is equal to or higher than the messaging software protocol version of all its associated backend systems. In this example, the installed messaging software versions for hub 1 (320), hub 2 (330), and hub 3 (340), (i.e., versions 2, 4, and 3, respectively) are all equal to or higher than the installed messaging software version of the sender system 310 (i.e., version 1), and the installed messaging software version of the receiver system 350 (i.e., version 2). Accordingly, each message hub can route the message to the next message hub with an equal or lower software protocol version. In the example shown in FIG. 3, protocol version 1 is used when a message is sent from the backend sender system, BEs 310, to hub 1 320 because protocol version 1 is the sender's (BEs 310) protocol version. Protocol version 2 is used when the message is sent from hub 1 (320) to hub 2 (330) because protocol version 2 is the lower of the protocol versions of hub 1 and hub 2 (v2<v4). Protocol version 3 is used when the message is sent from hub 2 (330) to hub 3 (340) (v4>v3), and protocol version 2 is used when the message is sent from hub 3 (340) to the backend receiver system, BEr 350 (v3>v2).

The hub-based messaging system is not limited to using only the lower protocol version between two components. In one implementation, a message hub may be downwards compatible only down to a certain protocol version while requiring that the associated backend systems should upgrade at least up to that protocol version. For example, a message hub system may be downwards compatible to an extent that requires the message hub to at least have an installed messaging software version 2. The associated backend systems may be required to at least use the same protocol version of the messaging software (e.g., an installed messaging software version 2). In this implementation, the higher protocol version may have more sophisticated protocol features that may be required in one or more components of the communication path. In another implementation, the backend systems may be downwards compatible to an extent without a requirement of having to be of an equal or lower software protocol version than their associated message hubs. In this implementation, the backend systems can support the protocol versions of the associated message hubs, and the backend systems may have a higher version than their associated message hubs.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a backend component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such backend, middleware, or front end components. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

Although only a few implementations have been described in detail above, other modifications are possible. For example, an optimization strategy may be used to optimize the ongoing message flow in the messaging system when upgrading the messaging software protocol version of one or more components. In one implementation, the upgrade strategy can be employed when the message hubs are upgraded without requiring installation or reconfiguration of the messaging software for the backend systems.

Other implementations may be within the scope of the following claims.

What is claimed is:

1. A method for routing messages in a hub-based messaging system, the method comprising:
   receiving a message at an inbound protocol converter module of a message hub, the message hub using a protocol version n, the message having a message protocol of a protocol version i, wherein $1 \leq i < n$;
   transforming the message protocol in the inbound protocol converter module from the protocol version i to the protocol version n;
   processing the message in the message hub according to the protocol version n after the transforming by the inbound protocol converter module;
   identifying a target link partner to which the message is to be routed from the message hub;
   determining a protocol version j used by the target link partner, wherein $1 \leq j < n$, the determining comprising consulting a lookup table that comprises entries that each list a potential link partner for the message hub and an associated protocol version used by the potential link partner, the consulting comprising selecting the protocol j used by the target link partner based on the entry for the target link partner, the protocol version n being greater than or equal to all of the associated protocol versions for all of the potential link partners listed in the entries in the lookup table;
   transforming the message protocol in an outbound protocol converter module of the message hub from the protocol version n to the protocol version j; and
   routing the message to the target link partner using the protocol version j.

2. The method of claim 1, further comprising:
   receiving a second message at the inbound protocol converter module, the second message being transmitted from a second message hub, the second message hub using the protocol version n and the second message having a second message protocol of the protocol version n;
   processing the message in the message hub according to the protocol version n;
   identifying a second target link partner to which the second message is to be routed from the message hub;
   determining, by consulting the lookup table, a protocol version k used by the second target link partner. wherein $1 \leq k < n$;
   transforming the second message protocol in the outbound protocol converter module of the message hub from the protocol version n to the protocol version k; and
   routing the second message to the second target link partner using the protocol version k.

3. The method of claim 1, wherein the target link partner comprises a second message hub having a lower protocol version than the protocol version n.

4. The method of claim 1, wherein the target link partner comprises a receiver backend system having a lower protocol version than the protocol version n.

5. The method of claim 1, further comprising updating an entry in the lookup table in response to the target link partner listed in the entry being upgraded from the protocol version i to a protocol version k, wherein k>j, and in response to receiving a second message to be routed to the target link partner;
   transforming the second message in the outbound protocol converter module of the message hub from the protocol version n to the protocol version k if k<n; and
   routing the second message to the target link partner using the protocol version k.

6. A message hub using a protocol version n, the message hub comprising:
   a storage device that stores a lookup table comprising entries that each list a potential link partner for the message hub and an associated protocol version used by the potential link partner, the protocol version n being greater than or equal to all of the associated protocol versions for all of the potential link partners listed in the entries in the lookup table; and
   a programmable processor that executes machine instructions to implement:
   an inbound protocol converter module that receives an inbound message having a message protocol of a protocol version i, wherein $1 \leq i < n$, the inbound protocol converter module transforming the message protocol to the protocol version n;
   a message processing module that processes the message according to the protocol version n after the transforming by the inbound protocol converter module;
   a link version identifier module that identifies a target link partner to which the message is to be routed from the message hub and that determines a protocol version j used by the target link partner, wherein $1 \leq j < n$, the determining comprising consulting the lookup table and selecting the protocol version j used by the target link partner based on the entry for the target link partner; and
   an outbound protocol converter module that transforms the message protocol from the protocol version n to the protocol version j, and that routes the message to the link partner utilizing the protocol version j.

7. The message hub of claim 6, wherein the inbound protocol converter module receives the message from another message hub.

8. The message hub of claim 6, wherein the inbound protocol converter module receives the message from sender backend system.

9. The message hub of claim 6, wherein the link partner comprises another message hub.

10. The message hub of claim 6, wherein the link partner comprises a receiver backend system.

11. The message hub of claim 6, further comprising an inbound protocol converter module corresponding to each protocol version from 1 to n−1, each inbound protocol converter module transforming an incoming message protocol to protocol version n.

12. The message hub of claim 6, further comprising an outbound protocol converter module corresponding to each protocol version from 1 to n−1, each outbound protocol converter module transforming a outgoing message protocol from protocol version n to the corresponding protocol version from 1 to n−1.

13. An article comprising a computer-readable storage medium tangibly embodying instructions that, when executed on one or more computers, cause the one or more computers to:
  receive a message at an inbound protocol converter module of a message hub, the message hub using a protocol version n, the message having a message protocol of a protocol version i, wherein 23 i<n;
  transform the message protocol in the inbound protocol converter module from the protocol version i to the protocol version n;
  process the message in the message hub according to the protocol version n after the transforming by the inbound protocol converter module;
  identify target link partner to which the message is to be routed from the message hub;
  determining a protocol version j used by the target link partner, wherein $1 \leq j < n$, the determining comprising consulting a lookup table that comprises entries that each list a potential link partner for the message hub and an associated protocol version used by the potential link partner, the consulting comprising selecting the protocol j used by the target link partner based on the entry for the target link partner, the protocol version n being greater than or equal to all of the associated protocol versions for all of the potential link partners listed in the entries in the lookup table;
  transform the message protocol in an outbound protocol converter module of the message hub from the protocol version n to the protocol version j; and
  route the message to the target link partner using the protocol version j.

14. The article of claim 13, wherein instructions further cause the one or more computers to:
  receive a second message at the inbound protocol converter module the second message being transmitted from a second message hub, the second message hub using the protocol version n and the second message having a second message protocol of the protocol version n;
  process the message in the message hub according to the protocol version n;
  identify a second target link partner to which the second message is to be routed from the message hub;
  determine, by consulting the lookup table, a protocol version k used by the second target link partner, wherein $1 \leq k < n$;
  transform the second message protocol in the outbound protocol converter module of the message hub from the protocol version n to the protocol version k; and
  route the second message to the second target link partner using the protocol version k.

15. The article of claim 13, wherein the target link partner comprises a second message hub having a lower protocol version than the protocol version n.

16. The article of claim 13, wherein the target link partner comprises a receiver backend system having a lower protocol version than the protocol version n.

17. The article of claim 13, further comprising instructions to cause the one or more computers to update an entry in the lookup table in response to the target link partner listed in the entry being upgraded from the protocol version j to a protocol version k, wherein k>j, and the instructions further cause the one or more computers to:
  transform the second message in the outbound protocol converter module of the message hub from the protocol version n to the protocol version k if k<n in response to receiving a second message to be routed to the target link partner; and
  route the second message to the target link partner using the protocol version k.

* * * * *